(12) United States Patent
Gupta et al.

(10) Patent No.: US 9,774,489 B1
(45) Date of Patent: Sep. 26, 2017

(54) ALLOCATING COMPUTING RESOURCES ACCORDING TO RESERVED CAPACITY

(75) Inventors: Diwakar Gupta, Redmond, WA (US); Varun Madan, Seattle, WA (US); James Ag Greenfield, Seattle, WA (US); Eric P. Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 580 days.

(21) Appl. No.: 12/893,793

(22) Filed: Sep. 29, 2010

(51) Int. Cl.
*H04L 29/08* (2006.01)
*H04L 12/24* (2006.01)

(52) U.S. Cl.
CPC ........ *H04L 29/08171* (2013.01); *H04L 41/00* (2013.01)

(58) Field of Classification Search
None
See application file for complete search history.

(56) References Cited

U.S. PATENT DOCUMENTS

| | | | |
|---|---|---|---|
| 2009/0300210 A1* | 12/2009 | Ferris | 709/235 |
| 2010/0131649 A1* | 5/2010 | Ferris | 709/226 |
| 2010/0332818 A1* | 12/2010 | Prahlad et al. | 713/150 |
| 2011/0126197 A1* | 5/2011 | Larsen | H04L 9/3213 718/1 |
| 2011/0185064 A1* | 7/2011 | Head et al. | 709/226 |
| 2011/0225299 A1* | 9/2011 | Nathuji et al. | 709/226 |
| 2011/0282982 A1* | 11/2011 | Jain | G06F 9/5094 709/223 |

\* cited by examiner

*Primary Examiner* — John B Walsh
(74) *Attorney, Agent, or Firm* — Thomas | Horstemeyer, LLP

(57) ABSTRACT

Disclosed are various embodiments for allocating computing resources according to reserved capacity. In one or more computing devices, a reserved machine instance is designated for a user in one of several zones of multiple networked computing devices. The networked computing devices include multiple machine instances in each of the zones. A request is obtained from the user to allocate a machine instance within the networked computing devices. A zone is selected for allocating the machine instance from the zones based at least in part on the zone that is associated with the reserved machine instance.

22 Claims, 6 Drawing Sheets

ALLOCATING COMPUTING RESOURCES ACCORDING TO RESERVED CAPACITY

BACKGROUND

A cloud computing resource may comprise a multitude of networked computing devices executing instances of virtual machines associated with customers. Customers may be capable of terminating machine instances or launching machine instances whenever they desire, thereby providing an elastic computing resource. Accordingly, customer applications executed in an elastic computing resource may be scaled as desired to handle practically any level of peak demand. Such an elastic computing resource may be very useful to customers who benefit from not having to invest in and maintain an expensive hardware infrastructure that may not be needed at all times.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to allocating computing resources according to reserved capacity. A customer may be able to reserve capacity in an elastic computing resource for a machine instance by establishing a reserved machine instance or otherwise establishing a reserved quantum of computing capacity. The elastic computing resource provider may benefit from customer reservations of capacity in simplified resource planning, upfront costs collected from the customers, and other areas. The customer may benefit from a lower marginal cost associated with using reserved capacity versus non-reserved capacity. Various embodiments of the present disclosure are configured to allocate computing resources to a customer within a zone based at least in part on reserved machine instances of the customer. Consequently, the customer may avoid unnecessary expenses associated with using non-reserved computing resources when reserved resources are available. In the following discussion, a general description of the system and its components is provided, followed by a discussion of the operation of the same.

Figure 1:
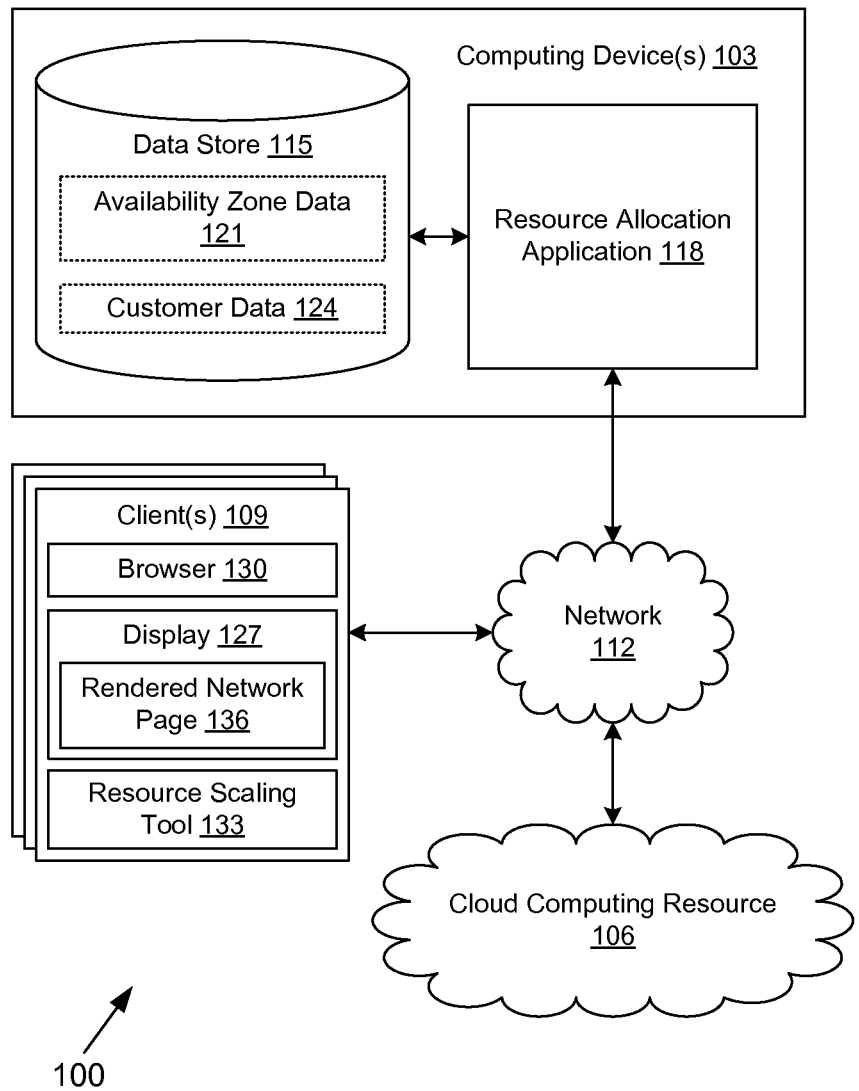
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with a cloud computing resource 106 and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include a resource allocation application 118 and other applications, services, processes, systems, engines, or functionality not discussed in detail herein. The resource allocation application 118 is executed to allocate resources, such as, for example, machine instances, within the cloud computing resource 106 to customers. Additionally, the resource allocation application 118 may be configured to reserve machine instances within the cloud computing resource 106 for future allocation to a customer.

The data stored in the data store 115 includes, for example, availability zone data 121, customer data 124, and potentially other data. The availability zone data 121 includes various data relating to computing resources in availability zones of a cloud computing resource 106. As a non-limiting example, the availability zone data 121 may include the status of each computing device, machine instance, or other component of an availability zone. The availability zone data 121 may also track computing capacity that has been reserved for future use by a customer so that the reserved capacity is not allocated improperly to another customer. The customer data 124 may include various data relating to a customer, such as availability zone preferences, reserved computing capacity information, currently executing machine instance information, and/or other information.

Figure 2:
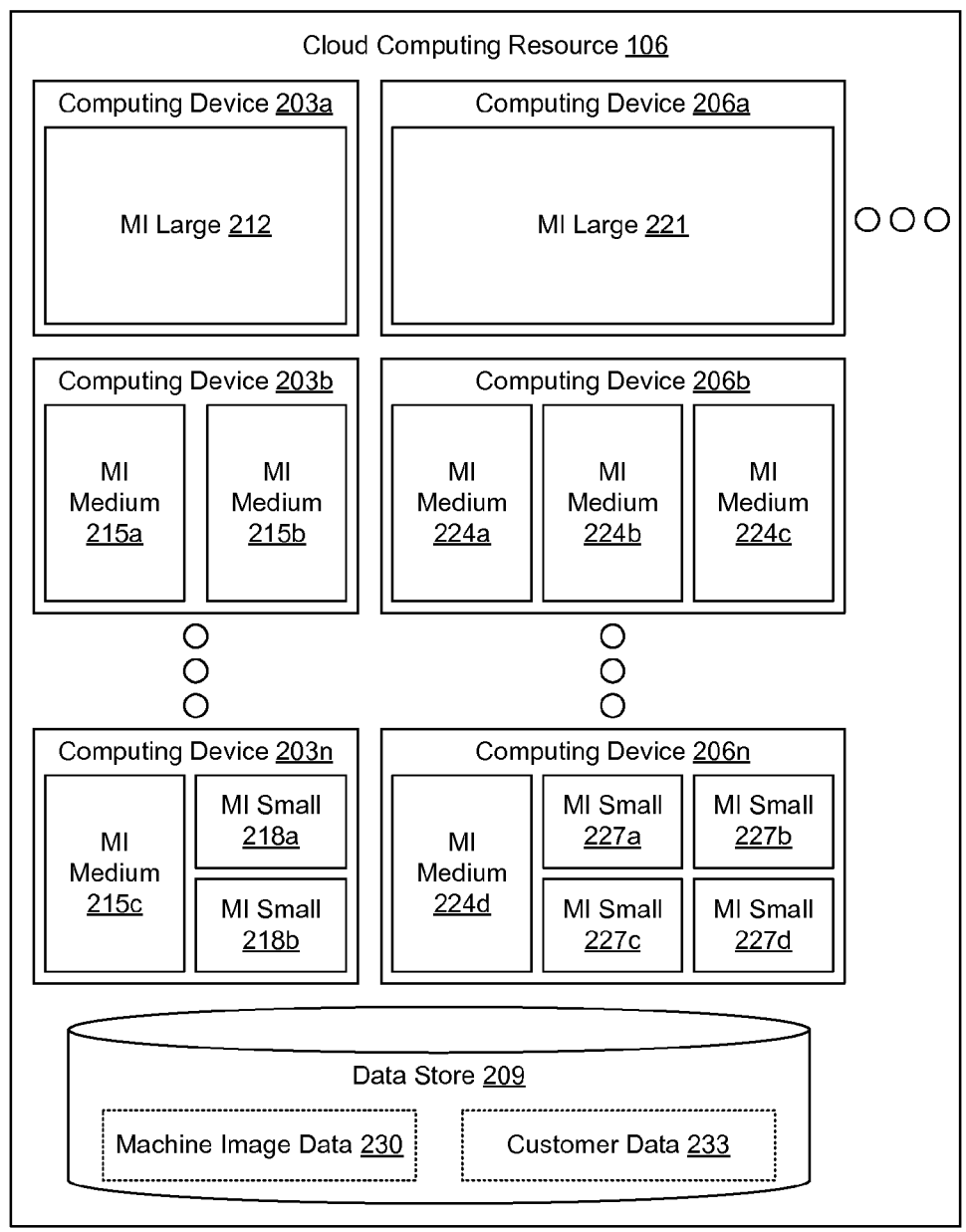
FIG. 2 is a diagram that illustrates one example of a cloud computing resource employed in the networked environment according to various embodiments of the present disclosure.

Referring next to FIG. 2, shown is one example of a cloud computing resource 106 according to various embodiments.

The cloud computing resource 106 includes a plurality of computing devices 203a, 203b . . . 203n, a plurality of computing devices 206a, 206b . . . 206n, and a data store 209. Such components of the cloud computing resource 106 may be in data communication with each other and/or external computing devices 103 (FIG. 1) by way of a network 112 (FIG. 1). Such computing devices 203 and 206 may be located in a single installation or may be dispersed among many different geographical locations.

Computing devices 203 and 206 may correspond to differing hardware platforms in various embodiments. Accordingly, computing devices 203 and 206 may have differing hardware configurations, for example, of central processing units (CPUs), system memory, data storage, network bandwidth, and/or other hardware characteristics. In one embodiment, all computing devices 203a, 203b . . . 203n may have a first hardware configuration, while all computing devices 206a, 206b . . . 206n may have a second hardware configuration. Although only two sets of computing devices 203 and 206 are shown, it is understood that there may be any number of sets of computing devices 203 and 206 having different hardware configurations.

Each computing device 203, 206 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 203 may support three types of machine instances: MI large 212, MI medium 215, and MI small 218, each of which may be associated with differing resource configurations. As a non-limiting example, each MI large 212 instance may have four CPU-equivalent units, 15 GB of system memory, and 1,000 GB of data storage. Each MI medium 215 instance may have two CPU-equivalent units, 10 GB of system memory, and 500 GB of data storage. Also, each MI small 218 instance may have one CPU-equivalent unit, 5 GB of system memory, and 250 GB of data storage. In the example of FIG. 2, computing devices 206 may also support three types of machine instances, namely, MI large 221, MI medium 224, and MI small 227. MI large 221, MI medium 224, and MI small 227 may have the same respective configurations as MI large 212, MI medium 215, and MI small 218 or may have different configurations as desired. As a non-limiting example, a MI large 221 instance may have four CPU-equivalent units, 20 GB of system memory, and 1,000 GB of data storage.

The example of three types of machine instances for each type of computing device 203, 206 is not intended to be limiting. In various embodiments, there may be more or fewer types of machine instances for each type of computing device 203, 206. In one embodiment, a machine instance may comprise an allocation of an entire computing device 203, 206 with no virtualization.

In the example of FIG. 2, one MI large 212 instance is executing on computing device 203a, two MI medium 215a, 215b instances are executing on computing device 203b, one MI medium 215c instance and two MI small 218a, 218b instances are executing on computing device 203n, one MI large 221 instance is executing on computing device 206a, three MI medium 224a, 224b, 224c instances are executing on computing device 206b, and one MI medium 224d instance and four MI small 227a, 227b, 227c, 227d instances are executing on computing device 206n. Each machine instance may be associated with a customer, though any customer may be associated with any number of machine instances.

In various embodiments, a customer may be capable of launching new machine instances and/or terminating machine instances dynamically. Thus, the cloud computing resource 106 may provide elastic computing capability to the customer that can vary over time. As a non-limiting example, a customer hosting an infrequently visited network site on a machine instance may suddenly get an influx of network page hits when the network site is mentioned on television or linked on a popular network site. The increase in network site traffic may overwhelm the computing capability of the machine instance, leading to poor network site performance and availability. To cope with the network site traffic, the customer may launch new machine instances and/or transition to a machine instance with more resources and better performance.

Various applications and/or other functionality may be executed in the machine instances and in the computing devices 203, 206 according to various embodiments. Also, various data is stored in a data store 209 that is accessible to the computing devices 203, 206. The data store 209 may be representative of a plurality of data stores 209 as can be appreciated. The data stored in the data store 209 includes, for example, machine image data 230, customer data 233, and potentially other data.

Machine image data 230 may include data used to launch a machine instance. Machine image data 230 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 233 may include customer-specific data. In one embodiment, all customer configuration data for a machine instance is stored in customer data 233. In this way, such data may be easily shared among many machine instances. As a non-limiting example, the customer data 233 may include network pages to be served up by one or more network page servers executing on machine instances associated with a customer. However, it is understood that in some embodiments customer-specific data may be stored within local data storage associated with a machine instance.

Figure 3:
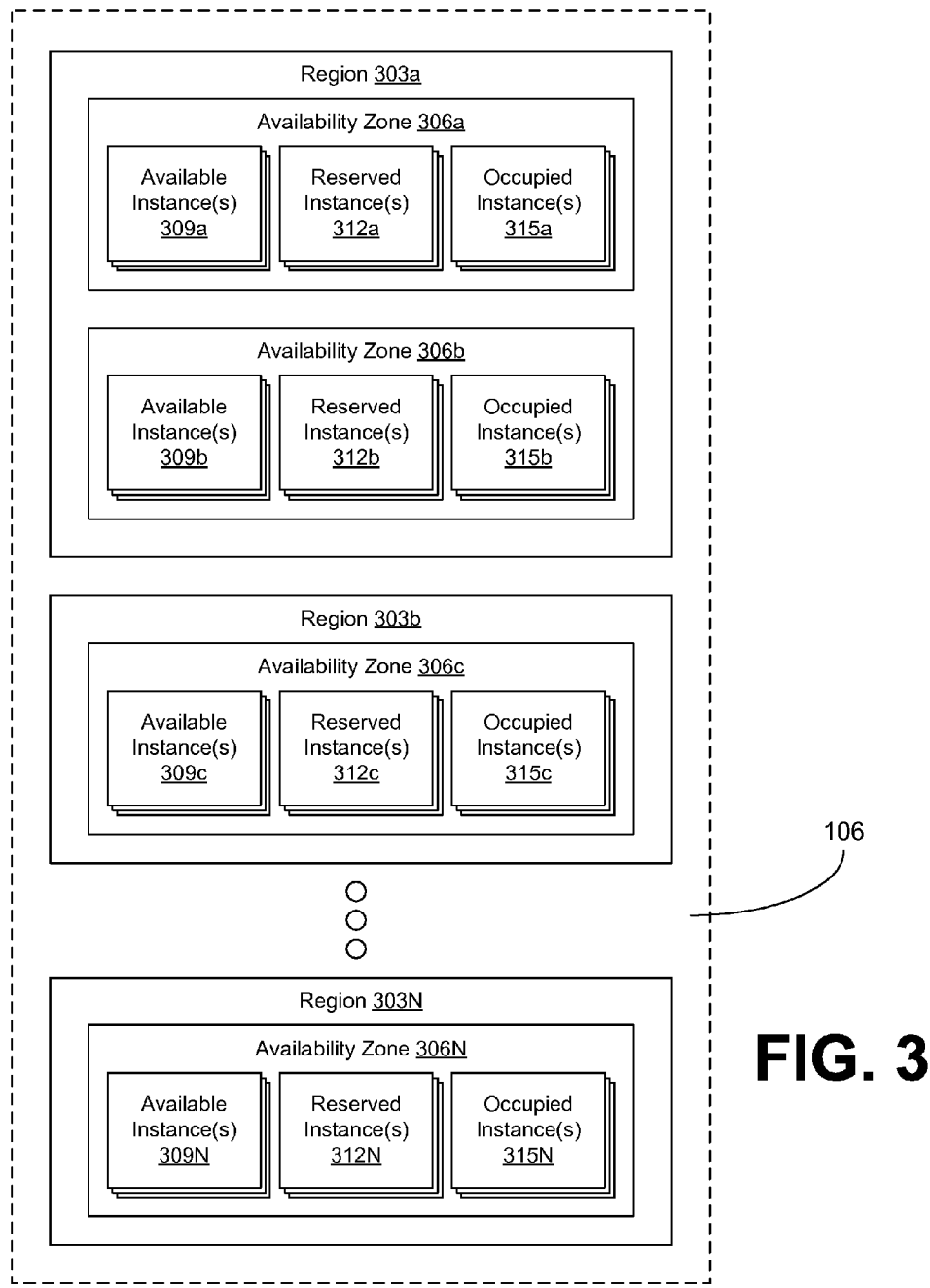
FIG. 3 is a diagram that depicts an example division of the cloud computing resource of FIG. 1 into regions and availability zones according to various embodiments of the present disclosure.

Turning now to FIG. 3, shown is an example division of the cloud computing resource 106 into a plurality of regions 303a, 303b . . . 303N and a plurality of availability zones 306a, 306b . . . 306N according to various embodiments. Each of the regions 303 may correspond to a deployment of computing devices 203, 206, etc. (FIG. 2) within the cloud computing resource 106 to a specific geographic area. Non-limiting examples of regions 303 may include a western United States region 303, an eastern United States region 303, a European Union region 303, an Asia-Pacific region 303, and others. The regions 303 are in data communication with one another by way of the network 112 (FIG. 1).

In one embodiment, the computing devices 203, 206, etc. of the cloud computing resource 106 may be deployed in multiple data centers that are geographically dispersed among multiple locations within a region 303. In another embodiment, the computing devices 203, 206, etc. may be deployed within in one or multiple data centers at or near a single location within the region 303. Such a location may correspond, for example, to an Internet peering point or another interconnect point of the network 112.

Each region 303 may include one or more availability zones 306. Each availability zone 306 may correspond to a distinct location of computing devices 203, 206 that is engineered to be insulated from failures in other availability zones 306. In one embodiment, an availability zone 306 may correspond to a data center. In other embodiments, an availability zone 306 may correspond to a floor, a portion of a floor, a rack, or another location within a data center. Because each availability zone 306 is configured to fail independently of the other availability zones 306, each availability zone 306 may be provided, for example, with a distinct generator or other backup power source, a distinct connection to the power grid, a distinct connection to the network 112, distinct equipment facilitating power and/or network 112 connections, distinct heating and/or cooling equipment, distinct fire protection, and/or other features. Thus, multiple availability zones 306 may be housed within a single data center or separate data centers depending in part on the available resources at a data center.

Each computing device 203, 206, etc. within an availability zone 306 may be in data communication with one another by way of a portion of the network 112. Such a portion of the network 112 may correspond to a local area network. In one embodiment, low-latency connectivity through the network 112 is provided between the availability zones 306 in a region 303. In one embodiment, network 112 traffic between availability zones 306 within the same region 303 may be associated with a lower cost than network 112 traffic between availability zones 306 within different regions 303. Additionally, it may be the case that network 112 traffic within an availability zone 306 may be associated with a lower cost than network 112 traffic between different availability zones 306 of the same region 303.

Each availability zone 306 may include one or more available instances 309, one or more reserved instances 312, one or more occupied instances 315, and/or other designations of computing resources. In various embodiments, the available instances 309, the reserved instances 312, and the occupied instances 315 may correspond to actual computing devices 203, 206, etc. and/or to virtual machine instances such as, for example, MI large 212, 221 (FIG. 2), MI medium 215, 224 (FIG. 2), MI small 218, 227 (FIG. 2), etc. The occupied instances 315 correspond to computing capacity within the respective availability zone 306 that is currently allocated to a customer. As a non-limiting example, a virtual machine instance may be loaded and executing for each occupied instance 315.

The available instances 309 correspond to computing capacity within the respective availability zone 306 that is currently available for allocation to any customer. By contrast, the reserved instances 312 correspond to computing capacity within the respective availability zone 306 that is reserved for use by a specific customer. Therefore, the reserved instances 312 are available for allocation only to the customer for whom they are reserved. The reserved instances 312 may be considered occupied instances 315 when they are currently allocated to the customer. In various embodiments, the customer may incur an additional upfront expense to establish a reserved instance 312 in the cloud computing resource 106. However, the customer may incur lower marginal expenses in allocating and using the reserved instance 312 compared to other available instances 309.

Referring back to FIG. 1, the client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display 127. The display 127 may comprise, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a browser 130, a resource scaling tool 133, and/or other applications. The browser 130 may be executed in a client 109, for example, to access and render network pages, such as web pages, or other network content served up by the computing device 103 and/or other servers, thereby generating a rendered network page 136 on the display 127. The resource scaling tool 133 may correspond to any client application that is configured to interface with the resource allocation application 118 for the purpose of scaling computing resources within the cloud computing resource 106 that are available for an application executed in the cloud computing resource 106. One non-limiting example of a commercially available resource scaling tool 133 is RightScale®, distributed by RightScale, Inc. of Santa Barbara, Calif. The client 109 may be configured to execute applications beyond the browser 130 and the resource scaling tool 133 such as, for example, email applications, instant message applications, and/or other applications.

Next, a general description of the operation of the various components of the networked environment 100 is provided. To begin, a customer at a client 109 establishes one or more reserved instances 312 (FIG. 3) in one or more availability zones 306 (FIG. 3) of the cloud computing resource 106. As a non-limiting example, the resource allocation application 118 may generate a network page-based user interface for setting up reserved instances 312. In one embodiment, the reserved instances 312 may be established for a customer by an agent at a client 109 interacting with the customer by way of a telephone call, web chat, or other communication medium. The customer may specify various parameters related to the reserved instances 312, such as, for example, region 303 (FIG. 3), availability zone 306, type of machine instance, etc. When the reserved instances 312 are established, they may be in an unallocated state with no corresponding machine instance executing in the cloud computing resource 106.

The customer may begin allocating and launching machine instances in the cloud computing resource 106 without regard to whether any reserved instances 312 have been established. To this end, the customer at the client 109 may manipulate one or more rendered network pages 136 or another user interface of a client-side application to generate a request for the resource allocation application 118 to allocate and launch machine instances. In one embodiment, a resource scaling tool 133 may be used to generate such a request automatically. In another embodiment, the resource allocation application 118 may be configured to monitor resource usage of the customer and to allocate and launch additional machine instances automatically.

Different customers may have different goals with regard to dispersion of their machine instances across availability zones 306. As a non-limiting example, one customer may prefer to have its machine instances localized in one availability zone 306 in order to decrease network latency and reduce costs. As another non-limiting example, another customer may prefer to have its machine instances dispersed among several availability zones 306 to reduce the possibility of outages. As another non-limiting example, another customer may prefer to have its machine instances within one region 303 because the customer is primarily associated with the region 303. As yet another non-limiting example, yet another customer may prefer to have its machine instances dispersed across multiple regions 303 because the customer is associated with multiple geographic areas.

The resource allocation application 118 is configured to allocate machine instances to a customer according to the availability zones 306 in which the customer has established reserved instances 312. The resource scaling tool 133, for example, may not indicate a preference for such an availability zone 306, thereby leaving it to the resource allocation application 118 to select an appropriate availability zone 306. The cloud computing resource 106 provider may be able to allocate machine instances in numerous ways, but by allocating instances that have already been reserved for the customer, the provider helps to reduce the expenses of the customer. When a customer does not have a free reserved instance 312, the resource allocation application 118 may select an availability zone 306 for allocating a machine instance based at least in part on a respective measure of available instances 309 (FIG. 3) in each of the availability zones 306. For example, the provider may prefer to allocate machine instances in availability zones 306 that have relatively high levels of available computing capacity.

Figure 4:
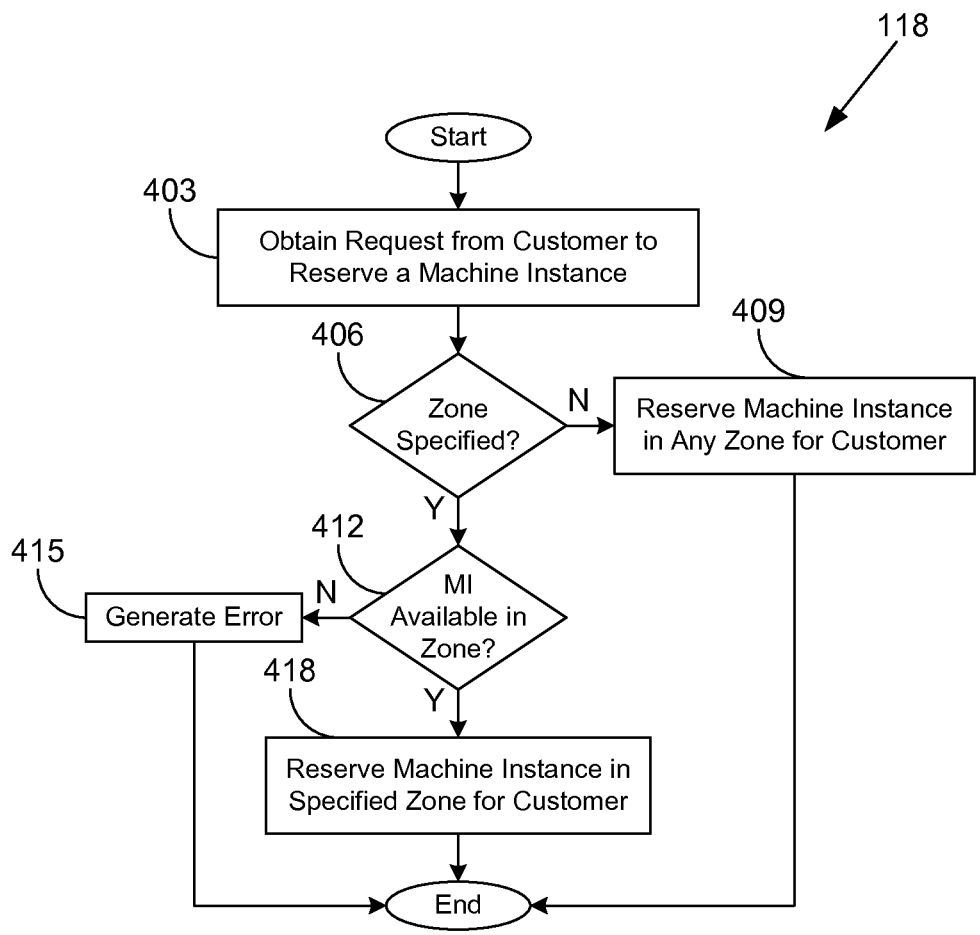
FIGS. 4 and 5 are flowcharts illustrating examples of functionality implemented as portions of a resource allocation application executed in a computing device in the networked environment of FIG. 1 according to various embodiments of the present disclosure.

Referring next to FIG. 4, shown is a flowchart that provides one example of the operation of a portion of the resource allocation application 118 according to various embodiments. It is understood that the flowchart of FIG. 4 provides merely an example of the many different types of functional arrangements that may be employed to implement the operation of the portion of the resource allocation application 118 as described herein. As an alternative, the flowchart of FIG. 4 may be viewed as depicting an example of steps of a method implemented in the computing device 103 (FIG. 1) according to one or more embodiments.

Beginning with box 403, the resource allocation application 118 obtains a request from a customer to reserve a machine instance in the cloud computing resource 106 (FIG. 1). In box 406, the resource allocation application 118 determines whether an availability zone 306 (FIG. 3) is specified. If no availability zone 306 is specified, the resource allocation application 118 moves to box 409 and reserves a machine instance in any availability zone 306 for the customer.

In one embodiment, the resource allocation application 118 may reserve an available instance 309 (FIG. 3) in an availability zone 306 that has a relatively high level of free computing capacity. In another embodiment, the resource allocation application 118 may reserve an available instance 309 in an availability zone 306 where the customer has the greatest number of occupied instances 315 (FIG. 3) and/or reserved instances 312. In yet another embodiment, the resource allocation application may reserve an available instance 309 in an availability zone 306 that is in a region 303 (FIG. 3) that is closest to the customer or preferred by the customer. If a customer is requesting the reservation of multiple machine instances and/or instances of a specific type, the availability zone 306 may be determined based in part on whether the available instances 309 within the availability zone 306 can satisfy the request. After the reserved instances 312 (FIG. 3) are designated for the customer, the portion of the resource allocation application 118 ends.

If the resource allocation application 118 determines that an availability zone 306 is specified in box 406, the resource allocation application 118 instead transitions to box 412 and determines whether a machine instance is available in the specified availability zone 306. In various embodiments, the resource allocation application 118 may determine whether a machine instance of a specified type is available in the specified availability zone 306. If no machine instance is available in the specified availability zone 306 to satisfy the request, the resource allocation application 118 generates an error in box 415. Thereafter, the portion of the resource allocation application 118 ends.

If the resource allocation application 118 determines that a machine instance is available in the specified availability zone 306, the resource allocation application 118 instead proceeds to box 418 and reserves a machine instance in the specified availability zone 306 for the customer. Consequently, a reserved instance 312 corresponding to a reserved quantum of computing capacity is designated for the customer. Thereafter, the portion of the resource allocation application 118 ends.

Figure 5:
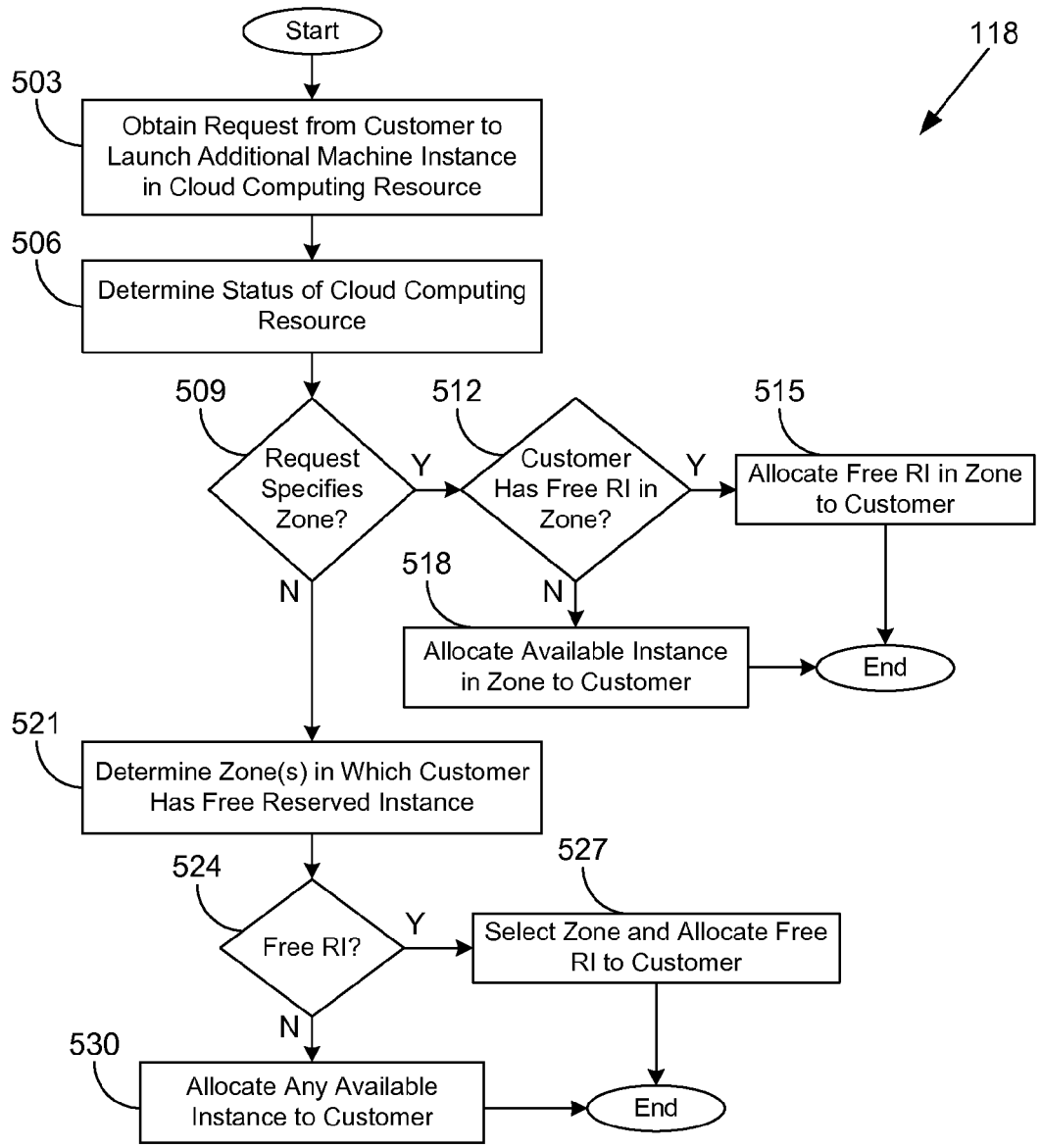

Moving on to FIG. 5, shown is a flowchart that provides one example of the operation of another portion of the resource allocation application 118 according to various embodiments. It is understood that the flowchart of FIG. 5 provides merely an example of the many different types of functional arrangements that may be employed to implement the operation of the portion of the resource allocation application 118 as described herein. As an alternative, the flowchart of FIG. 5 may be viewed as depicting an example of steps of a method implemented in the computing device 103 (FIG. 1) according to one or more embodiments.

Beginning with box 503, the resource allocation application 118 obtains a request from a customer to launch an additional machine instance in the cloud computing resource 106 (FIG. 1). The request may specify, for example, an availability zone 306 (FIG. 3), a region 303 (FIG. 3), an instance type, and/or other parameters. Such a request may be generated automatically by a resource scaling tool 133 (FIG. 1) executed in a client 109 (FIG. 1) or may be generated automatically by the resource allocation application 118 based at least in part on the resource usage of the customer in the cloud computing resource 106. The request may also be generated through a user interaction with a client application executed in the client 109 that interfaces with the resource allocation application 118 over the network 112 (FIG. 1). In one embodiment, the resource allocation application 118 may generate network pages which are displayed in the client 109 as rendered network pages 136 (FIG. 1). The rendered network pages 136 may include a management user interface for originating the request to launch an additional machine instance.

In box 506, the resource allocation application 118 determines the current status of the cloud computing resource 106. The resource allocation application 118 may refer to the availability zone data 121 (FIG. 1) and/or other data to determine the current status. As a non-limiting example, the resource allocation application 118 may determine the available instances 309 (FIG. 3), the reserved instances 312 (FIG. 3), the occupied instances 315 (FIG. 3), and the instance types associated with each for one or more of the availability zones 306 of the cloud computing resource 106.

In box 509, the resource allocation application 118 determines whether the request specifies an availability zone 306. If the request does specify an availability zone 306, the resource allocation application 118 proceeds to box 512 and determines whether the customer has a free reserved instance 312 in the specified availability zone 306 that is capable of satisfying the request. If the customer does have a free reserved instance 312 in the specified availability zone 306 that is capable of satisfying the request, the resource allocation application 118 proceeds to box 515 and allocates the free reserved instance 312 in the specified availability zone 306 to the customer. Consequently, the reserved instance 312 may be designated as an occupied instance 315 and loaded, for example, from a machine image or other data in the data store 209 (FIG. 2). Thereafter, the portion of the resource allocation application 118 ends.

If the customer does not have a free reserved instance 312 in the specified availability zone 306 that is capable of satisfying the request, the resource allocation application 118 moves instead to box 518 and allocates an available instance 309 in the specified availability zone 306. The available instance 309 may then be designated as an occupied instance 315 and loaded, for example, from a machine image or other data in the data store 209. Thereafter, the portion of the resource allocation application 118 ends.

If, in box 509, the resource allocation application 118 determines that the request does not specify an availability zone 306, the resource allocation application 118 moves to box 521. In box 521, the resource allocation application 118 determines the availability zones 306 in which the customer has one or more free reserved instances 312. In box 524, the resource allocation application 118 determines whether the customer has any free reserved instances 312 that are capable of satisfying the request. If the customer does have free reserved instances 312 that are capable of satisfying the request, the resource allocation application 118 proceeds to box 527 and selects an availability zone 306 having a free reserved instance 312 and allocates the free reserved instance 312 to the customer.

If the customer has multiple free reserved instances 312 across multiple availability zones 306, the resource allocation application 118 may select a reserved instance 312 from an availability zone 306 that has more occupied instances 315 associated with the customer than the other availability zones 306 with free reserved instances 312. In other embodiments, the resource allocation application 118 may select a reserved instance 312 from an availability zone 306 according to a specified region 303. It is understood that various approaches may be employed to select a reserved instance 312 when multiple reserved instances 312 of the customer are available. Thereafter, the portion of the resource allocation application 118 ends.

If the resource allocation application 118 instead determines in box 524 that no free reserved instances 312 are available for the customer, the resource allocation application 118 transitions to box 530 and allocates any available instance 309 to the customer. It is understood that selection of such an available instance 309 may be performed according to many different approaches. As a non-limiting example, the resource allocation application 118 may select an available instance 309 from an availability zone 306 that has more occupied instances 315 associated with the customer than the other availability zones 306. As another non-limiting example, the resource allocation application 118 may select an available instance 309 from an availability zone 306 that has the greatest number of available instances 309 or unused computing capacity. Thereafter, the portion of the resource allocation application 118 ends.

Figure 6:
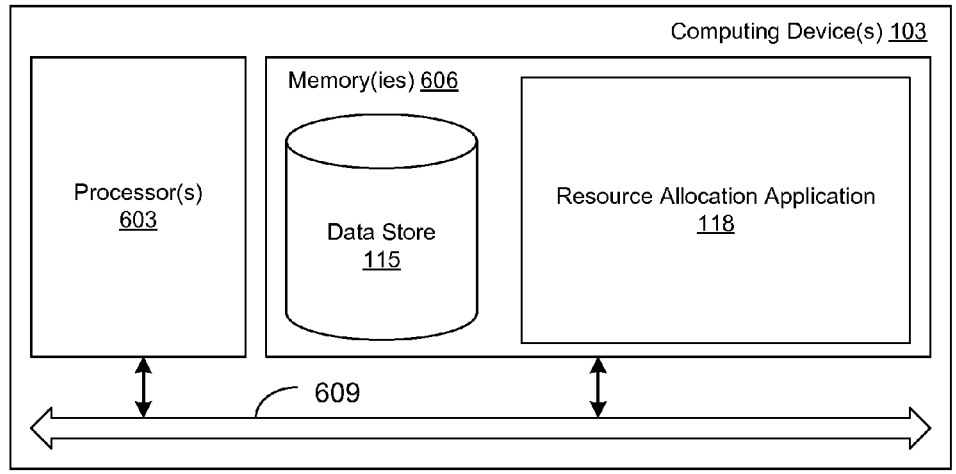
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the resource allocation application 118 and potentially other applications. Also stored in the memory 606 may be a data store 115 and other data. In addition, an operating system may be stored in the memory 606 and executable by the processor 603.

Figure 7:
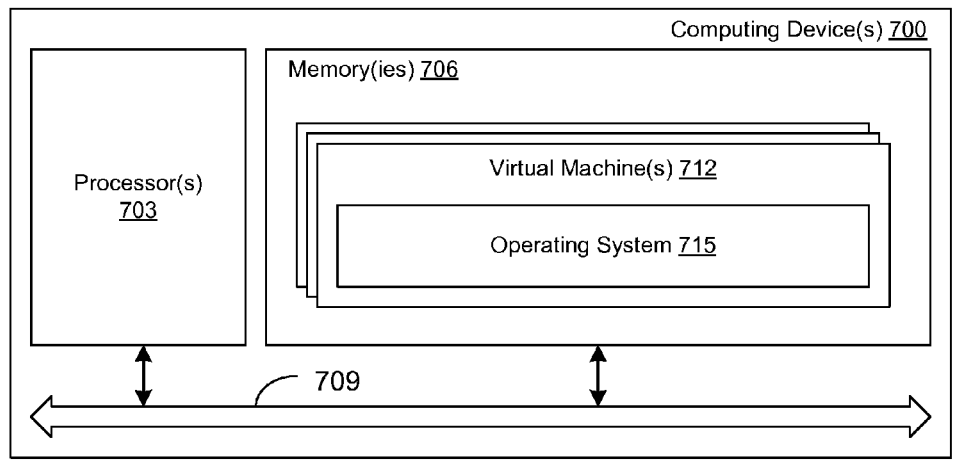
FIG. 7 is a schematic block diagram that provides one example illustration of a computing device employed in the cloud computing resource of FIG. 1 according to various embodiments of the present disclosure.

Turning now to FIG. 7, shown is a schematic block diagram of a computing device 700 according to an embodiment of the present disclosure. The computing device 700 is representative of a computing device 203, 206 (FIG. 2) used in the cloud computing resource 106 (FIG. 1). The computing device 700 includes at least one processor circuit, for example, having a processor 703 and a memory 706, both of which are coupled to a local interface 709. To this end, the computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are one or more virtual machines 712 and potentially other applications. Each virtual machine 712 is representative of an instance of a virtual machine such as, for example, MI large 212, 221 (FIG. 2), etc., executing in the computing device 700. Each virtual machine 712 may include an operating system 715 executable in the virtual machine 712 and any number of other applications and data. In addition, an operating system may be stored in the memory 706 and executable by the processor 703.

With reference to both FIGS. 4 and 5, it is understood that there may be other applications that are stored in the memories 606, 706 and are executable by the processors 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memories 606, 706 and are executable by the processors 603, 703. In this respect, the term "executable" means a program file that is in a form that can ultimately be run by the processors 603, 703. Examples of executable programs may be, for example, a compiled program that can be translated into machine code in a format that can be loaded into a random access portion of the memories 606, 706 and run by the processors 603, 703, source code that may be expressed in proper format such as object code that is capable of being loaded into a random access portion of the memories 606, 706 and executed by the processors 603, 703, or source code that may be interpreted by another executable program to generate instructions in a random access portion of the memories 606, 706 to be executed by the processors 603, 703, etc. An executable program may be stored in any portion or component of the memories 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 606, 706 are defined herein as including both volatile and nonvolatile memory and data storage components. Volatile components are those that do not retain data values upon loss of power. Nonvolatile components are those that retain data upon a loss of power. Thus, the memories 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 603, 703 may represent multiple processors 603, 703 and the memories 606, 706 may represent multiple memories 606, 706 that operate in parallel processing circuits, respectively. In such a case, the local interfaces 609, 709 may be an appropriate network 112 (FIG. 1) that facilitates communication between any two of the multiple processors 603, 703, between any of the processors 603, 703 and any of the memories 606, 706, or between any two of the memories 606, 706, etc. The local interfaces 609, 709 may comprise additional systems designed to coordinate this communication, including, for example, performing load balancing. The processors 603, 703 may be of electrical or of some other available construction.

Although the resource allocation application 118, the virtual machines 712, the operating system 715, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the resource allocation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the resource allocation application 118, the virtual machines 712, and the operating system 715, that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the Therefore, the following is claimed:

1. A non-transitory computer-readable medium embodying a program executable in at least one computing device, wherein when executed the program causes the at least one computing device to at least:
reserve computing capacity corresponding to a reserved machine instance for a user within a particular availability zone of a plurality of availability zones operated by a computing resource provider;
obtain a request from the user to allocate a machine instance, wherein the request does not specify any of the plurality of availability zones;
determine a measure of computing capacity allocated to the user in individual ones of the plurality of zones;
select the particular availability zone based at least in part on the measure of computing capacity allocated to the user in the particular availability zone and determining that the user has the reserved machine instance available for use in the particular availability zone; and
launch a machine instance corresponding to the reserved machine instance for the user in the particular availability zone.

2. The non-transitory computer-readable medium of claim 1, wherein when executed the program further causes the at least one computing device to assess an upfront cost to the user for reserving the computing capacity corresponding to the reserved machine instance, and launching the machine instance in the particular availability zone is associated with a lower marginal expense than launching the machine instance in another availability zone of the plurality of availability zones in which reserved computing capacity is not available for the user.

3. The non-transitory computer-readable medium of claim 1, wherein individual ones of the plurality of availability zones have different power sources.

4. The non-transitory computer-readable medium of claim 1, wherein individual ones of the plurality of availability zones are housed in different data centers.

5. A system, comprising:
at least one computing device; and
at least one application executable in the at least one computing device, wherein when executed the at least one application causes the at least one computing device to at least:
designate a reserved quantum of computing capacity for a user within a particular zone of a plurality of zones of an environment operated by a provider;
obtain a request to allocate a quantum of computing capacity for the user within the environment, wherein the request does not specify any of the plurality of zones;
determine a measure of computing capacity allocated to the user in individual ones of the plurality of zones;
select the particular zone in response to the request based at least in part on the measure of computing capacity allocated to the user in the particular zone and determining that the reserved quantum of computing capacity is available; and
allocate the reserved quantum of computing capacity in the particular zone to the user as the quantum of computing capacity.

6. The system of claim 5, wherein when executed the at least one application further causes the at least one computing device to at least:
determine a measure of unused computing capacity in the individual ones of the plurality of zones; and
select the particular zone further based at least in part on the measure of unused computing capacity in the particular zone.

7. The system of claim 5, wherein the request is automatically generated based at least in part on a resource usage in the environment associated with the user.

8. The system of claim 5, wherein the user incurs a lower marginal expense in allocating the reserved quantum of computing capacity as compared to a non-reserved quantum of computing capacity.

9. The system of claim 5, wherein the reserved quantum of computing capacity is not in use by the user when the request is received.

10. The system of claim 5, wherein intra-zone network traffic within the individual ones of the plurality of zones is associated with a lower cost to the user than inter-zone network traffic between the individual ones of the plurality of zones.

11. The system of claim 5, wherein intra-zone network traffic within the individual ones of the plurality of zones is associated with lower network latency than inter-zone network traffic between the individual ones of the plurality of zones.

12. The system of claim 5, wherein when executed the at least one application further causes the at least one computing device to at least refrain from allocating the reserved quantum of computing capacity to another user when the reserved quantum of computing capacity is not in use.

13. The system of claim 5, wherein selecting the particular zone in response to the request is further based at least in part on determining that the particular zone has a greatest reserved quantum of computing capacity as compared to at least one other zone of the plurality of zones.

14. The system of claim 5, wherein the quantum of computing capacity corresponds to a virtual machine instance.

15. A method, comprising:
designating, by at least one computing device, a reserved machine instance for a user in a particular zone of a plurality of zones of a plurality of networked computing devices, the plurality of networked computing devices including a plurality of machine instances in individual ones of the plurality of zones;
obtaining, by the at least one computing device, a request to allocate a machine instance for the user within the plurality of networked computing devices, wherein the request does not specify any of the plurality of zones;
determining, by the at least one computing device, a measure of computing capacity allocated to the user in the individual ones of the plurality of zones; and
selecting, by the at least one computing device, the particular zone from the plurality of zones for allocating the machine instance based at least in part on the measure of computing capacity allocated to the user in the particular zone and the reserved machine instance being available and being in the particular zone.

16. The method of claim 15, wherein allocating the machine instance in the particular zone with the reserved machine instance that is available is associated with a lower marginal expense to the user than allocating the machine instance in another zone of the plurality of zones in which no reserved machine instance of the user is available.

17. The method of claim 15, wherein at least two of the plurality of zones are located in different countries.

18. The method of claim 15, wherein at least two of the plurality of zones are located in a same data center but serviced by distinct generators.

19. The method of claim 15, wherein the request originates from a management user interface that facilitates specification of a specified zone.

20. The method of claim 15, wherein while the reserved machine instance is designated for the user, the reserved machine instance cannot be allocated to another user.

21. The method of claim 15, further comprising assessing, by the at least one computing device, an upfront expense to the user in response to designating the reserved machine instance for the user.

22. The method of claim 15, further comprising:
    determining, by the at least one computing device, a measure of unused computing capacity in the individual ones of the plurality of zones; and
    selecting, by the at least one computing device, the particular zone further based at least in part on the measure of unused computing capacity in the particular zone.

\* \* \* \* \*